US011743946B2

(12) United States Patent
Pjanic et al.

(10) Patent No.: US 11,743,946 B2
(45) Date of Patent: Aug. 29, 2023

(54) DYNAMIC ESTIMATION OF RANDOM ACCESS RESPONSE REPETITIONS

(71) Applicant: Telefonaktiebolaget LM Ericsson (publ), Stockholm (SE)

(72) Inventors: Dino Pjanic, Malmö (SE); Sergio Almansa-Valverde, Lund (SE); Gabriel Cercel, Helsingborg (SE); Waqas Nawaz Khan, Lund (SE); André Nyberg, Staffanstorp (SE); Fredrik Saarnak, Löddeköpinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 545 days.

(21) Appl. No.: 16/648,802

(22) PCT Filed: Oct. 17, 2017

(86) PCT No.: PCT/EP2017/076488
§ 371 (c)(1),
(2) Date: Mar. 19, 2020

(87) PCT Pub. No.: WO2019/076443
PCT Pub. Date: Apr. 25, 2019

(65) Prior Publication Data
US 2020/0221502 A1    Jul. 9, 2020

(51) Int. Cl.
*H04W 74/08* (2009.01)
*H04W 4/70* (2018.01)
*H04W 72/23* (2023.01)

(52) U.S. Cl.
CPC ......... *H04W 74/0833* (2013.01); *H04W 4/70* (2018.02); *H04W 72/23* (2023.01)

(58) Field of Classification Search
CPC . H04W 74/0833; H04W 4/70; H04W 72/042; H04W 74/006; H04W 74/004
See application file for complete search history.

(56) References Cited

U.S. PATENT DOCUMENTS

2016/0381715 A1* 12/2016 Lee .................. H04W 74/0841
370/329
2017/0265229 A1* 9/2017 Yang ................ H04W 74/0833
(Continued)

FOREIGN PATENT DOCUMENTS

CA          2995677 A1      2/2017
WO   WO-2015115960 A1 *   8/2015 ......... H04W 74/006

OTHER PUBLICATIONS

Alcatel-Lucent et al., "PRACH Coverage Enhancement for MTC UE", 3GPP TSG-RAN WG1 Meeting #75, San Francisco, USA, Nov. 11, 2013, pp. 1-8, R1-135155, 3GPP.

(Continued)

*Primary Examiner* — Charles C Jiang
*Assistant Examiner* — Shawn D Miller
(74) *Attorney, Agent, or Firm* — Coats & Bennett, PLLC

(57) ABSTRACT

The present disclosure relates to methods and arrangements for dynamically configuring repeated transmission of random access response messages from an access node, wherein the random access response message is repeatedly transmitted in response to receipt of a random access request from wireless device operating in a coverage enhancement, CE, mode and wherein the random access response message is configured for repeated transmission on a downlink channel using a repetition level selected from a set of repetition levels associated with a CE level of the CE mode. The repetition level represents a predetermined number of repeated transmissions and the CE level represents a group of wireless devices with similar radio conditions. The method comprises determining, for a predetermined data set, a ratio of successful to initiated random access attempts when applying a selected repetition level of the set of repetition levels for repeated transmission of the random access response messages on the downlink channel, wherein a random access attempt is counted as successful responsive (Continued)

to receipt of a first uplink transmission on a packet uplink shared channel, PUSCH. The method further comprises selecting an operational repetition level of the set of repetition levels for repeated transmission of random access response messages on the downlink channel based on the determined ratio.

20 Claims, 6 Drawing Sheets

(56) References Cited

U.S. PATENT DOCUMENTS

| | | | | |
|---|---|---|---|---|
| 2018/0132273 | A1* | 5/2018 | Zhang | H04L 5/0053 |
| 2018/0288810 | A1* | 10/2018 | Ishii | H04W 48/12 |
| 2019/0036647 | A1* | 1/2019 | Gowda | H04W 52/0219 |
| 2020/0322992 | A1* | 10/2020 | Isogawa | H04W 74/0833 |

OTHER PUBLICATIONS

Ericsson, "Msg3/Msg4 Transmission for MTC", 3GPP TSG RAN WG1 Meeting #82bis, Malmö, Sweden, Oct. 5, 2015, pp. 1-4, R1-155040, 3GPP.

Ericsson, "NB-IoT—Remaining Issues for Random Access Procedure", 3GPP TAG-RAN WG1 NB-IoT Ad-Hoc Meeting, Sophia Antipolis, France, Mar. 22, 2016, pp. 1-7, R1-161836, 3GPP.

Alcatel-Lucent et al., "Considerations on PRACH and LC-MTC", 3GPP TSG RAN WG1 Meeting #80, Athens, Greece, Feb. 9, 2015, pp. 1-6, R1-150132, 3GPP.

* cited by examiner

DYNAMIC ESTIMATION OF RANDOM ACCESS RESPONSE REPETITIONS

TECHNICAL FIELD

The present disclosure relates generally to a random access control and more specifically to methods and arrangements for dynamically configuring repeated transmission of random access response messages from an access node.

BACKGROUND

Universal Mobile Telecommunication System (UMTS), Long Term Evolution (LTE), and 5G, are examples of technologies for realizing high-speed packet-based communication in wireless communication systems. The Universal Terrestrial Radio Access Network, UTRAN, is the radio access network of a UMTS, Evolved UTRAN, E-UTRAN, is the radio access network of an LTE system, and New Radio, NR, the radio access network of 5G. In an UTRAN, E-UTRAN or NR, a wireless device, e.g., a User Equipment, UE, is wirelessly connected to a Radio Base Station, RBS, also known as a NodeB or eNodeB. An RBS is a general term for a network node capable of transmitting radio signals to a wireless device and receiving signals transmitted by the wireless device.

The future development of cellular networks also comprises large numbers of small, possibly autonomous, wireless devices, which typically transmit and receive only small amounts of data infrequently. These devices are generally assumed not to be associated with humans, but are rather sensors or actuators of different kinds, which communicate with application servers for the purpose of configuration of and data receipt from said autonomous devices within or outside the cellular network in use cases like smart buildings, smart meters, logistics etc. This type of communication is referred to as Machine Type Communication, MTC, whereas the devices are denoted MTC devices. So called Cat-M UEs are targeting the massive MTC use cases. Due to their low-end character, Cat-M UEs will have single receive antenna and narrow receiver bandwidth, will in many instances suffer from poor coverage, and will be deployed in huge numbers.

As MTC devices are assumed to typically transmit rather seldom, their transmissions will in most cases be preceded by a random access procedure that establishes the device's access to a network and reveals the device's identity to the network.

A brief overview of a random access procedure will be provided here below.

A first step in the random-access procedure comprises transmission of a random access request (RAR) message, also known as a random-access preamble, from the wireless device. The random access preamble is transmitted on a Random Access Channel, RACH, i.e., the Physical Random-Access Channel, PRACH.

As a second step, after a random access attempt, i.e., transmission of the random access preamble, a Cat-M UE monitors a MTC physical downlink control channel (MPDCCH) Common Search Space (CSS) Type2 and is expected to decode the information on that channel. The MPDCCH channel provides information about next coming transmission on a Physical Downlink Shared Channel (PDSCH). The eNodeB transmits a message on the PDSCH in response to receipt of the random access preamble. The response may comprise an index of the random-access preamble sequences that the network detected and for which the response is valid.

A UE which does not receive any random access response to its transmission of step 1 above within a pre-defined time window, will consider the random access attempt failed, and may repeat the random access pre-amble transmission, possibly with higher transmit power, up to a maximum number before considering the entire random-access procedure failed.

The third step of the random access procedure serves, e.g., to assign a unique identity to the UE within the cell, C-RNTI. In this third step, the UE transmits the necessary information to the eNodeB using the PUSCH resources assigned to the UE in the Random Access Response.

The fourth and last step of the random-access procedure comprises a downlink message, also known as the RRC Connection Setup message. Each terminal receiving the downlink message will compare the identity in the message with the identity transmitted in the third step. Only a terminal which observes a match, will declare the random access procedure successful, otherwise the terminal will need to restart the random access procedure.

In 3GPP, coverage enhancement is proposed for MTC applications. In order to achieve the coverage targeted for the low-complexity wireless devices and other types of wireless devices that are being operated for delay tolerant MTC applications, repetition techniques may be used. Two coverage enhancement (CE) modes based on repetition techniques have been defined, CE mode A and B. Both modes consist of two CE levels. For CE mode A, CE levels 0 and 1 are implied. For CE mode B, CE levels 2 and 3 are implied. The CE modes are defined to address compensation of the coverage loss from the narrow receiver bandwidth and single RX antenna. The compensation is achieved by retransmitting (repeating) data on physical channels. Each CE level consists of 4 repetition levels, namely [r1, r2, r3, r4] where r4 is the highest allowed repetition level within a certain CE level ($r_{max}$).

The maximal number of repetitions on MPDCCH, $r_{max}=\{1, 2, 4, 8, 16, 32, 64, 128, 256\}$, is configured over RRC. For common scheduling, $r_{max}$ is broadcasted in SIB2 and defined by the parameter mpdcch-NumRepetition-RA-r13. These parameters are configured per CE level, i.e. the IE PRACH-ConfigSIB will include one value per CE level. However, configuration of the maximum number of repetitions on MPDCCH CSS Type2 channel r4 ($r_{max}$) (as well as its derivatives like r1, r2, r3) have no real-time correlation to the channel quality conditions.

Consequently, while coverage enhancement may be achieved through the proposed repetition techniques, a mismatch may remain between the used number of repetitions and channel quality conditions.

SUMMARY

An object of the present disclosure is to provide solutions which seek to mitigate, alleviate, or eliminate one or more of the above-identified deficiencies in the art and to provide solutions for adapting a random access procedure, and more specifically repetition levels during coverage enhancement modes, to channel quality conditions.

According to a first aspect, this object is achieved by a method for dynamically configuring repeated transmission of random access response messages from an access node, wherein the random access response message is repeatedly transmitted in response to receipt of a random access request from wireless device operating in a coverage enhancement, CE, mode and wherein the random access response message is configured for repeated transmission on a downlink channel using a repetition level selected from a set of repetition levels associated with a CE level of the CE mode. The repetition level represents a predetermined number of repeated transmissions and the CE level represents a group of wireless devices with similar radio conditions.

The method comprises determining, for a predetermined data set, a ratio of successful to initiated random access attempts when applying a selected repetition level of the set of repetition levels for repeated transmission of the random access response messages on the downlink channel, wherein a random access attempt is counted as successful responsive to receipt of a first uplink transmission on a packet uplink shared channel, PUSCH. The method further comprises selecting an operational repetition level of the set of repetition levels for repeated transmission of random access response messages on the downlink channel based on the determined ratio.

In some embodiments, the wireless device is a Machine Type Communication, MTC, device.

In some embodiments, the downlink channel is an MTC physical downlink control channel, MPDCCH or a physical downlink shared channel, PDSCH.

In some embodiments, the predetermined data set represents data collected on the CE level, and the data is collected on the CE level for a predetermined number of random access attempts or over a predetermined time period.

In some embodiments, the method further comprises applying the selected operational repetition level.

In some embodiments, a first operational repetition level is selected based on a ratio determined for an initial data set collected when applying a selected initial repetition level.

In some embodiments, the selected initial repetition level is a highest allowed repetition level, wherein a highest allowed repetition level represents a highest predetermined number of repeated transmissions within the set of repetition levels associated with the CE level.

In some embodiments, the method further comprises repeating the method by performing the determining when applying the selected operational repetition level.

In some embodiments, the repeating is performed with a periodicity correlated to the selected operational repetition level.

In some embodiments, the predetermined data set comprises, when the selected operational repetition level represents a repetition level lower than the highest allowed repetition level, a smaller amount of data than that of the highest repetition level.

In some embodiments, the method further comprises reapplying a previous repetition level when the ratio of successful to initiated random access attempts is reduced in response to applying the selected operational repetition level.

In some embodiments, the method further comprises compiling a sequence of repetition levels to be applied based on time of day, the sequence of repetition levels comprising the initial repetition level and one or more operational repetition levels.

In some embodiments, the selected operational repetition level is selected and applied for repeated transmission of random access response messages on the MPDCCH channel.

In some embodiments, the selected operational repetition is selected and applied for repeated transmission of random access response messages on the PDSCH channel.

According to a second aspect, the object is achieved by a computer readable storage medium, having stored thereon a computer program, which, when executed, causes execution of the method according to the first aspect.

According to a third aspect of the disclosure, the object is also achieved by an arrangement for dynamically configuring repeated transmission of random access response messages from an access node, wherein the random access response message is repeatedly transmitted in response to receipt of a random access request from wireless device operating in a coverage enhancement, CE, mode and wherein the random access response message is configured for repeated transmission on a downlink channel using a repetition level selected from a set of repetition levels associated with a CE level of the CE mode. The repetition level represents a predetermined number of repeated transmissions and the CE level represents a group of wireless devices with similar radio conditions. The arrangement comprises processing circuitry configured to cause determination, for a predetermined data set, of a ratio of successful to initiated random access attempts when applying a selected repetition level of the set of repetition levels for repeated transmission of the random access response messages on the downlink channel, wherein a random access attempt is counted as successful responsive to receipt of a first uplink transmission on a packet uplink shared channel, PUSCH. The processing circuitry is further configured to cause selection of an operational repetition level of the set of repetition levels for repeated transmission of random access response messages on the downlink channel based on the determined ratio.

A fourth aspect is a network node comprising the arrangement of the third aspect.

In some embodiments, any of the above aspects may additionally have features identical with or corresponding to any of the various features as explained above for any of the other aspects.

An advantage of some embodiments is optimized physical resource handling and thereby an increased capacity, especially during a random access (RA) procedure.

Another advantage of some embodiments is that the RA procedure may be performed in a more expedient manner and the faster RA procedure will result in a faster attach procedure which is beneficial for massive MTC such as Cat-M UEs.

Other advantages of embodiments are a minimization of excessive resource usage, less radio interference and a decrease of power consumption.

BRIEF DESCRIPTION OF DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
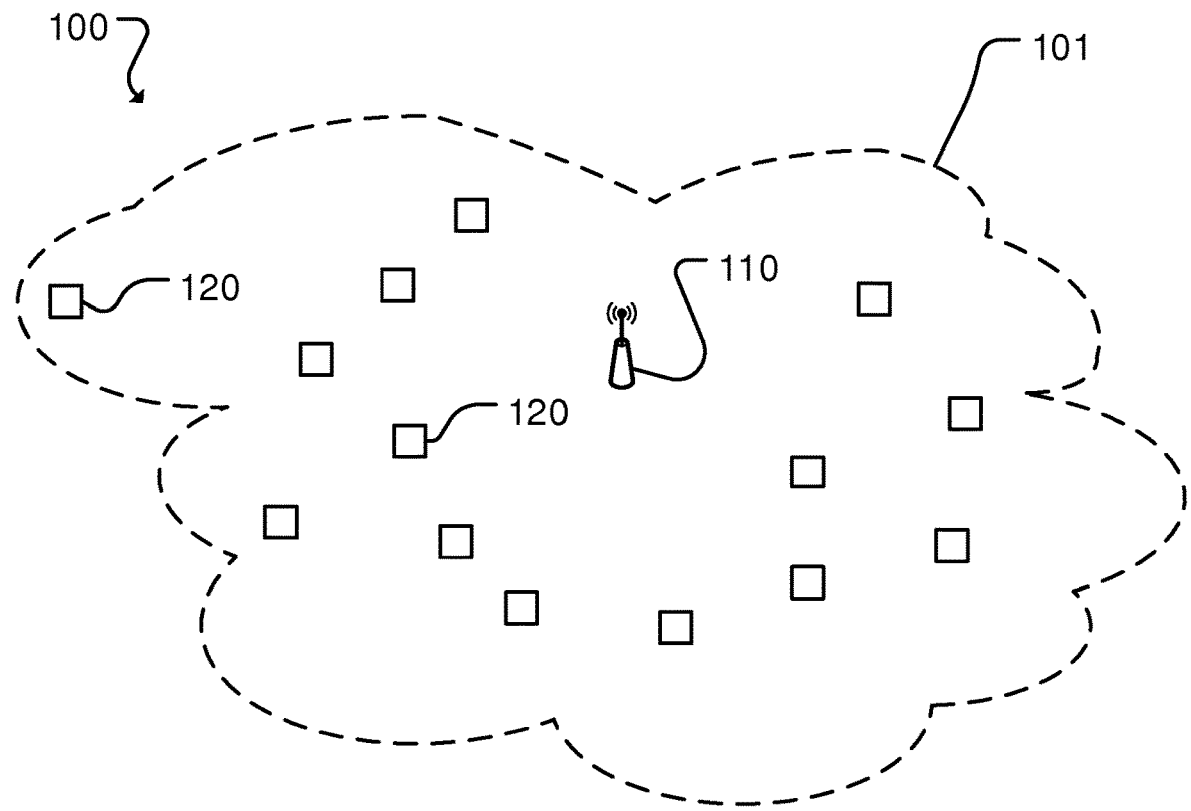
FIG. 1 schematically illustrates a network node and an associated cell comprising an MTC device in a wireless network.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. In the context of the present disclosure "comprises/comprising" is taken to specify the presence of stated features, integers, steps, or components, but does not preclude the presence or addition of one or more other features, integers, steps, components, or groups thereof.

In the following disclosure, the term wireless device will be used to refer to remote wireless equipment that are configured for wireless access to a network node, e.g., a mobile device (MD), mobile station (MS), user equipment (UE), subscriber station, remote terminal, wireless terminal, user device (such as a mobile telephone or smartphone) or a stationary device or semi-stationary device, e.g., a so called cat-M UE for Machine Type Communication (MTC) use cases or any other type of MTC device set up for MTC in a wireless network structure.

A network infrastructure component that provides wireless access to the wireless device will be referred to as an access node. Depending on the network type, other well-known terms for such a network entity are radio base station (RBS), eNodeB, eNB or access point. These terms may be used interchangeably and are used to refer to network infrastructure components that provide wireless access to wireless devices.

FIG. 1 schematically illustrates a radio access network 100 comprising a base station 110 and wireless devices 120, e.g., so called MTC devices configured for machine type communication (MTC) such as Category M (Cat-M) UEs, a second generation of LTE devices configured for IoT applications. In a cell 101 like the one disclosed in FIG. 1, wireless devices are located at different distances from the base station 110, wherein the channel characteristics vary, e.g. due to distance to base station, disturbing radio sources or obstacles such as buildings.

The access node comprises a preamble receiver and a random access response transmitter. One of the wireless devices 120 is performing random access to the access node 110, which comprises generating and transmitting a preamble sequence to the access node 110, which preamble sequence is received by the preamble receiver in the access node 110.

The wireless device initiates the random access procedure by selecting the appropriate CE level. Selection of CE levels may be performed by comparing a measured RSRP value with each of three RSRP threshold values. If a measured RSRP value is less than the RSRP threshold for the CE level 3, then the wireless device is configured with the parameter values of CE level 3. If the measured value is greater than RSRP threshold of CE level 3, and less than RSRP threshold value for CE level 2, then the wireless device is configured with the parameter values of CE level 2. If the measured value is greater than RSRP threshold of CE level 2, and less than RSRP threshold value for CE level 1, then the wireless device is configured with the parameter values of CE level 1 and finally, if a measured value is greater than the RSRP threshold value for CE level 1, the wireless device is configured according to CE level 0. The present disclosure assumes use of CE levels and sets of repetition levels corresponding to each CE level; the above presented selection of CE level represents a current method for selecting CE levels but does not limit the present disclosure.

Figure 2:
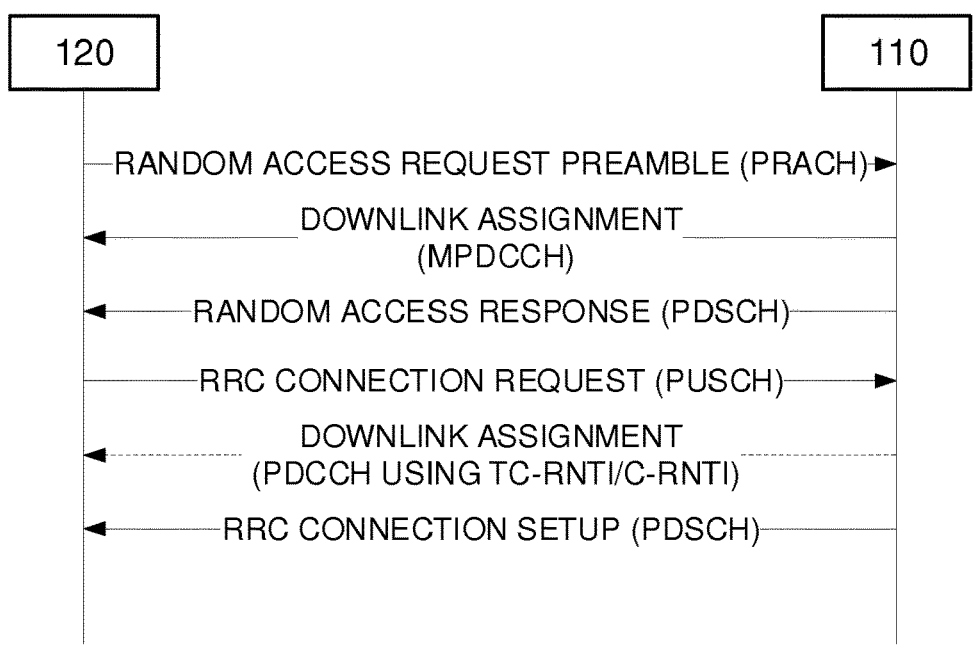
FIG. 2 illustrates a sequence of messages exchanged between an MTC device and an eNodeB during a random access procedure.

The random access procedure essentially comprises four basic steps which encompass a sequence of messages exchanged between the wireless device 120 and the access node 110, as generally illustrated in FIG. 2. These basic four steps are briefly discussed below.

A first step in the random-access procedure comprises transmission of a random access request (RAR) message, also known as a random-access preamble, from the wireless device 120. The random access preamble is transmitted on a Random Access Channel, RACH, i.e., the Physical Random-Access Channel, PRACH.

As a second step, after a random access attempt, i.e., transmission of the random access preamble, the wireless device 120, e.g., a Cat-M UE, monitors a MTC physical downlink control channel (MPDCCH) Common Search Space (CSS) Type2 and is expected to decode the information on that channel. The MPDCCH channel provides information about next coming transmission on a Physical Downlink Shared Channel (PDSCH). The access node 110 transmits a message on the PDSCH in response to receipt of the random access preamble. The response may comprise an index of the random-access preamble sequences that the network detected and for which the response is valid.

The wireless device 120 which does not receive any random access response to its transmission of step 1 above within a pre-defined time window, will consider the random access attempt failed, and may repeat the random access pre-amble transmission, possibly with higher transmit power, up to a maximum number before considering the entire random-access procedure failed.

The third step of the random access procedure serves, e.g., to assign a unique identity to the wireless device 120 within the cell 101, C-RNTI. In this third step, the wireless device 120 transmits the necessary information to the access node using the PUSCH resources assigned to the wireless device 120 in the Random Access Response.

The fourth and last step of the random-access procedure comprises a downlink message, also known as the RRC Connection Setup message. Each wireless device 120 receiving the downlink message will compare the identity in the message with the identity transmitted in the third step. Only a wireless device which observes a match, will declare the random access procedure successful, otherwise the wireless device will need to restart the random access procedure. Consequently, while a successful random access attempt implies success in all of the above mentioned steps, a failure may be due to a failure in each of the above mentioned steps.

In 3GPP, coverage enhancement is proposed for MTC applications. In order to achieve the coverage targeted for the low-complexity wireless devices and other types of wireless devices that are being operated for delay tolerant MTC applications, repetition techniques may be used. Two coverage enhancement (CE) modes based on repetition techniques have been defined, CE mode A and B. Both modes consist of two CE levels. For CE mode A, CE levels 0 and 1 are implied. For CE mode B, CE levels 2 and 3 are implied. The CE levels may be determined as disclosed above.

The CE modes are defined to address compensation of the coverage loss from the narrow receiver bandwidth and single RX antenna. The compensation is achieved by retransmitting (repeating) data on physical channels. Each CE level consists of 4 repetition levels, namely [r1, r2, r3, r4] where r4 is the highest allowed repetition level within a certain CE level ($r_{max}$).

The maximal number of repetitions on MPDCCH, $r_{max}=\{1, 2, 4, 8, 16, 32, 64, 128, 256\}$, is configured over RRC. For common scheduling, $r_{max}$ is broadcasted in a System Information Block (SIB), i.e., SIB2, and defined by the parameter mpdcch-NumRepetition-RA-r13. These parameters are configured per CE level, i.e. the IE PRACH-ConfigSIB will include one value per CE level. However, configuration of the maximum number of repetitions on MPDCCH CSS Type2 channel r4 ($r_{max}$) (as well as its derivatives like r1, r2, r3) have no real-time correlation to the channel quality conditions.

MTC-devices, e.g., Cat-M UEs, are normally subject to poor coverage, e.g., due to narrow receiver bandwidth and single RX antenna. In order to achieve coverage for low-complexity wireless devices and other types of wireless devices operating delay tolerant MTC applications, time repetition techniques are used both in the transmitting of a random access preamble and in the transmission of responses.

CE modes target compensation of the coverage loss from the narrow receiver bandwidth and single RX antenna. The compensation is achieved by retransmitting (repeating) data on physical channels. Each CE level consists of 4 repetition levels, namely [r1, r2, r3, r4] where r4 is the highest allowed repetition level within a certain CE level ($r_{max}$).

From eNB perspective it is possible to configure $r_{max}$ up to value 256 and still have the option to transmit MPDCCH with fewer repetitions.

The maximal number of repetitions on MPDCCH, $r_{max}=\{1, 2, 4, 8, 16, 32, 64, 128, 256\}$, is configured over RRC. For common scheduling, $r_{max}$ is broadcasted in SIB2 and defined by the parameter mpdcch-NumRepetition-RA-r13. These parameters are configured per CE level, i.e. the IE PRACH-ConfigSIB will include one value per CE level.

Figure 3:
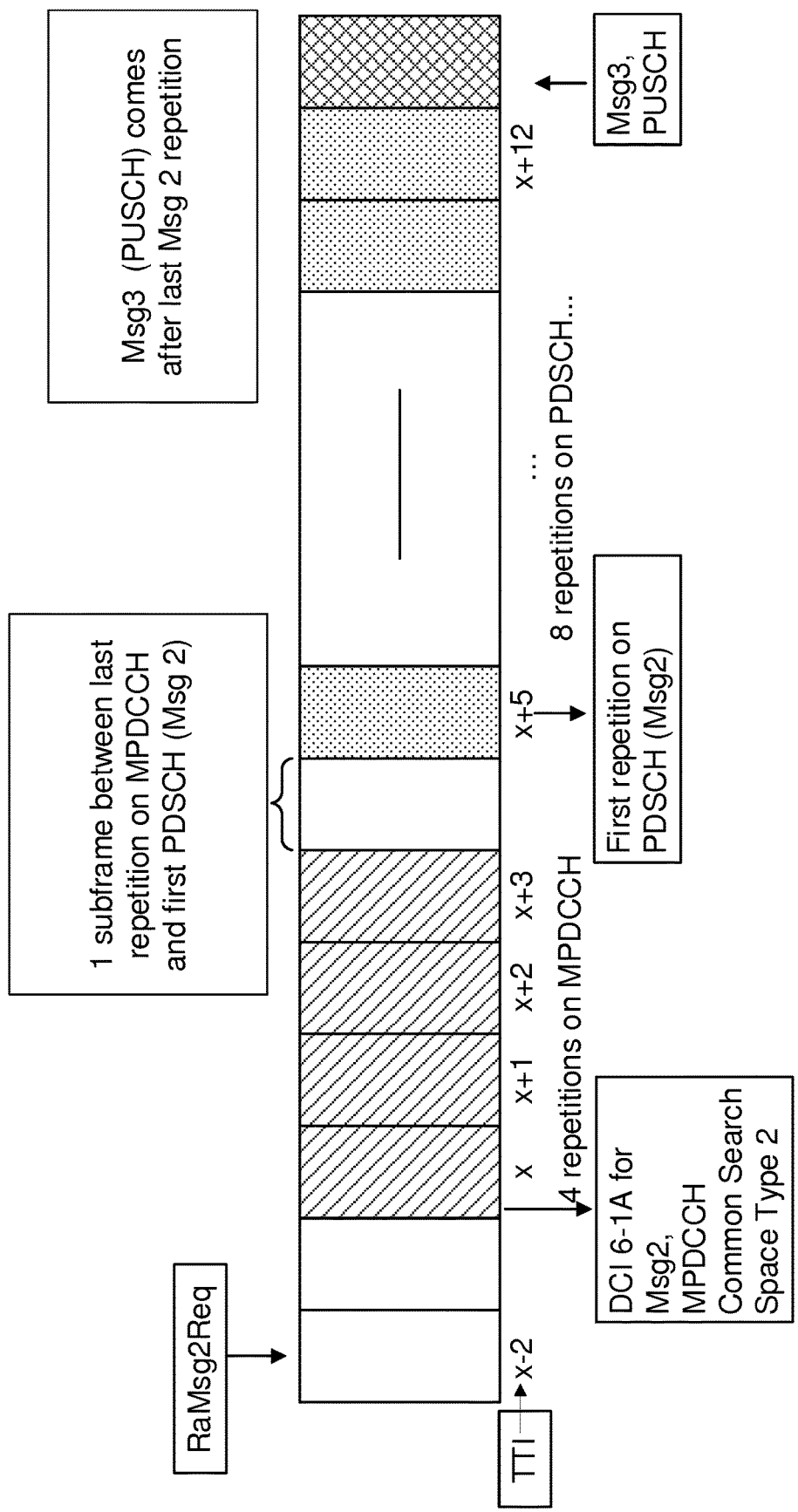
FIG. 3 Is a schematic representation of a physical channel aspects during the random access procedure.

FIG. 3 discloses Msg1, Msg2 and Msg3 timing in an example of 4 repetitions on MPDCCH CSS Type 2 and 8 repetitions on PDSCH. Turning back to FIG. 2 and the four steps of the random access procedure, Msg1 is transmitted during the first step, Msg2 is transmitted during the second step and Msg3 in the third step.

In the context of the present disclosure, a random access attempt will be considered as successful if Msg3 is received at the access node, implying that the wireless device has successfully decoded both MPDCCH and PDSCH channel.

The following disclosure will benefit from information relating to a ratio between such successful random access attempts and initiated random access attempts and is not limited to an understanding where failure or success occurred in the above disclosed individual steps, e.g., if a failure is due to an inability to receive the MPDCCH CSS type 2 component of Msg2 or an inability to receive the PDSCH component of Msg2. A dynamic selection of coverage enhancement repetitions is proposed as well as a method to predict the most appropriate repetition values.

In its most general form, the present disclosure presents a solution wherein successful random access attempts from live traffic situations in a given cell are used as a data source to improve selection of a number of random access response repetitions required in the random access procedure, e.g., to enable a dynamic selection of number of repetitions required on an MPDCC CSS Type 2 channel.

Figure 4:
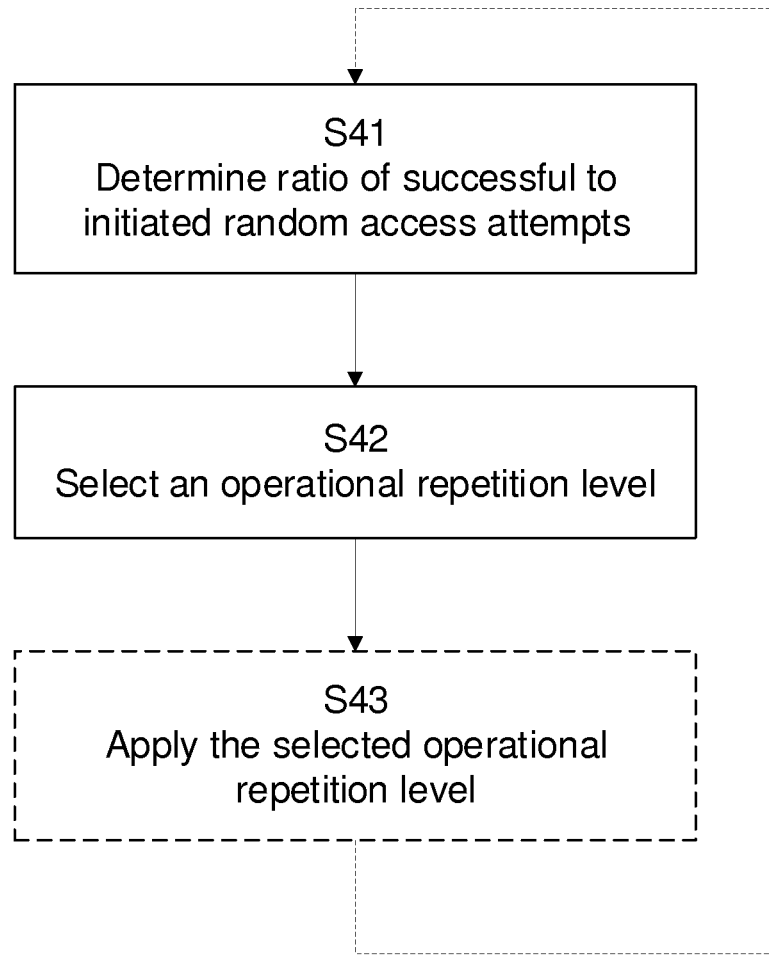
FIG. 4 is a flowchart illustrating example method steps according to some embodiments.

FIG. 4 is a flowchart illustrating example method steps according to some embodiments for use in a method to dynamically configure repeated transmission of random access response messages from an access node, wherein the random access response message is repeatedly transmitted in response to receipt of a random access request from wireless device operating in a coverage enhancement, CE, mode and wherein the random access response message is configured for repeated transmission on a downlink channel using a repetition level selected from a set of repetition levels associated with a CE level of the CE mode.

In some embodiments, the wireless device is a Machine Type Communication, MTC, device, e.g., a cat-M UE as described above. In some embodiments, the downlink channel is an MTC physical downlink control channel, MPDCCH, e.g., an MPDCCH CSS Type 2, or a physical downlink shared channel, PDSCH.

Each CE level may be associated with 4 repetition levels, namely [r1, r2, r3, r4] where r4 is the highest allowed repetition level, representing the highest number of repetitions, within a certain CE level ($r_{max}$). The maximal number of repetitions on MPDCCH, $r_{max}=\{1, 2, 4, 8, 16, 32, 64, 128, 256\}$, is configured over RRC. For common scheduling, $r_{max}$ is broadcasted in a System Information Block (SIB), i.e., SIB2, and defined by the parameter mpdcch-NumRepetition-RA-r13. These parameters may be configured per CE level, i.e. the IE PRACH-ConfigSIB will include one value per CE level. Thus, the repetition level represents a predetermined number of repeated transmissions and the CE level represents a group of wireless devices with similar radio conditions The method comprises determining S41, for a predetermined data set, a ratio of successful to initiated random access attempts when applying a selected repetition level of the set of repetition levels for repeated transmission of the random access response messages on the downlink channel, wherein a random access attempt is counted as successful responsive to receipt of a first uplink transmission on a packet uplink shared channel, PUSCH. Thus, in the context of the present disclosure, a random access attempt will be considered as successful if Msg 3, see FIG. 3, is received at the access node, implying that the wireless device has successfully decoded both MPDCCH and PDSCH channel.

Thus, both failing and successful random access attempts in a specific period of time in real traffic situations are used as sources of information to create a more dynamic selection of number of repetitions; opening for possibility to use other repetition levels such as r1, r2 and r3 instead of only r4 ($r_{max}$).

In some embodiments, the predetermined data set represents data collected on the CE level, and the data is collected on the CE level for a predetermined number of random access attempts or over a predetermined time period. For example, in an initial stage like upon cell setup/unlock, random access (RA) success rate may be analysed for all wireless device, e.g., Cat-M UEs, during some hours. This would be the situation for a cell without any historical RA data. In other instances, the latest most successful repetition level may be applied. All the wireless devices that attach to the cell may be subject to analysis of RA success rate, wherein the analysis of RA success rate may be performed according to assigned CE level. Other patterns maybe also be observed like frequency of RA attempts for a particular time of the day etc.

The method further comprises selecting S42 an operational repetition level of the set of repetition levels for repeated transmission of random access response messages on the downlink channel based on the determined ratio.

Unless there are too few attach attempts (unreliable source of statistics) or the RA success rate is too low, the access node will be triggered to use next lower repetition level on the MPDCCH CSS Type 2 and/or the PDSCH for Msg2 channel. In some embodiments, the selected operational repetition level is selected for repeated transmission of random access response messages on the MPDCCH channel and/or selected for repeated transmission of random access response messages on the PDSCH channel.

In some embodiments, a first operational repetition level is selected based on a ratio determined for an initial data set collected when applying a selected initial repetition level. For example, in an initial stage like upon cell setup/unlock, random access (RA) success rate may be analysed for all wireless device, e.g., Cat-M UEs, during some hours. This would be the situation for a cell without any historical RA data. The first operational repetition level is then selected based on the ratio determined for this initial data set. The data may be collected during some initial time using the default values for a number of repetitions and then after a while those values can become subject for change based on the output from the using the proposed method. Each CE level shall be handled as separate cluster representing a group of UEs with similar radio conditions.

In some embodiments, the selected initial repetition level is a highest allowed repetition level, wherein a highest allowed repetition level represents a highest predetermined number of repeated transmissions within the set of repetition levels associated with the CE level.

In some embodiments, the method further comprises applying S43 the selected operational repetition level, wherein the selected operational repetition level may be applied for repeated transmission of random access response messages on the MPDCCH channel and/or applied for repeated transmission of random access response messages on the PDSCH channel.

In some embodiments, the method further comprises repeating the method by performing the determining S41 when applying the selected operational repetition level. Thus, the procedure may be repeated using the selected operational repetition level. When applying the operational repetition level, a current RA success rate may continuously be observed using the method on collected data as a background operation and any deviation from the previous success rate resulting in increased failing attempts may trigger a roll back to previous repetition level on either one or both of the MPDCCH and PDSCH channel.

The wireless devices are not informed about the actual change on MPDCCH and will therefore continue to blindly decode the channels for the number of repetitions signalled in the system information. Optimization of MPDCCH is applied solely on the access node side while the optimization of PDSCH is signalled to the wireless device in DCI.

Once a certain operational repetition level is found to be stable it will be signalled in the system information. From that point both the access node and wireless devices may be updated with the latest repetition level used on MPDCCH and PDSCH channel.

In some embodiments, the repeating is performed with a periodicity correlated to the selected operational repetition level.

In some embodiments, the predetermined data set comprises, when the selected operational repetition level represents a repetition level lower than the highest allowed repetition level, a smaller amount of data than that of the highest repetition level.

In some embodiments, the method further comprises reapplying a previous repetition level when the ratio of successful to initiated random access attempts is reduced in response to applying the selected operational repetition level.

The above proposed method aspects will be presented in the use case exemplified below, wherein a reduced set of statistics, i.e., a smaller amount of data is used when determining the ratio of successful to initiated random access attempts going from a highest allowed repetition level r4 to a lower level r3. The use case also discloses how an initial repetition level may be reapplied when the ratio of successful to initiated random access attempts is reduced when applying a lower repetition level, i.e., using fewer repetitions.

1. The method is initiated on highest repetition level r4 in the repetition set [r1, r2, r3, r4]. Statistics is collected from 1000 RA attempts providing a fail rate 5% (50 failed attempts), implying a ratio of successful to initiated random access attempts of 0.95.
2. Based on the output from step 1, a lower repetition level r3 is selected as the operational repetition level. Statistics is collected as in step 1.

After 200 RA attempts the ratio of successful to initiated random access attempts is lower than in step 1, resulting in a failure rate that exceeds 5% (11 failed attempts). Repetition level r4 will then be reselected as the operational repetition level.

3. The procedure is repeated with repetition level r4. The time/attempts to switch to repetition level r3 again should now be longer. Assuming that statistics is again collected from a 1000 RA attempts, resulting in a ratio of successful to initiated random access attempts of 0.90, i.e., a fail rate 10%, an operational repetition level may be selected using a more comprehensive set of statistics collected for the repetition level R4, i.e., 2000 attempts, 150 failed, 7.5% fail rate.
4. Selecting the r3 as an operational repetition level again, the monitoring would now be performed based on the repetition level r3 and the ratio of successful to initiated random access attempts of 0.925, i.e., 92.5% or a fail rate of 7.5%.

This time the fail rate is not exceeded when monitoring over a predefined timer or a same number of RA attempts as used in any of the above steps.

5. Based on the outcome from using r3, the random access response procedure is further streamlined by attempting an operational repetition level of r2 and continued collection of statistics using this lower repetition level.

When observing a reduction in the ratio of successful to initiated random access attempts following collection of statistics from 100 RA attempts, implying that the fail rate of 7.5% is exceeded, r3 is reselected as operational repetition level.

6. If statistics collected during a certain time span or during a predetermined number of attempts for the resumed operational repetition level of r3 again implies improvements in ability of the wireless device to receive random access response message, repetition level r2 may be reselected as an operational repetition level. If it is chosen to stay on repetition level r3 and it is perceived as a stable, this level may be signalled in system information.

Consequently, by using the herein presented method, it is possible to achieve a dynamic selection of number of repetitions required for an access response message, e.g., on the MPDCCH CSS Type2 channel and/or on the PDSCH channel.

In some embodiments, the method further comprises compiling a sequence of repetition levels to be applied based on time of day, the sequence of repetition levels comprising the initial repetition level and one or more operational repetition levels, e.g., shifting between levels r4, r3, r2 and r1 according to a predetermined sequence of repetition that may be based on the time of day, e.g., selecting a lowest repetition level during hours when there are few random access attempts.

It will be understood from the above presented use case, that the present disclosure enables compiling of data that can provide a statistic instrument for decision making whether the current number of repetitions on MPDCCH CSS Type2 is too high/low or just sufficient. Beneficial results are an optimized physical resource handling and thereby increased capacity during RA procedure, a faster RA procedure that will result in faster attach procedure which is beneficial for massive MTC devices such as Cat-M UEs, minimization of excessive resource usage, reduced radio interference and decreased power consumption.

Figure 5:
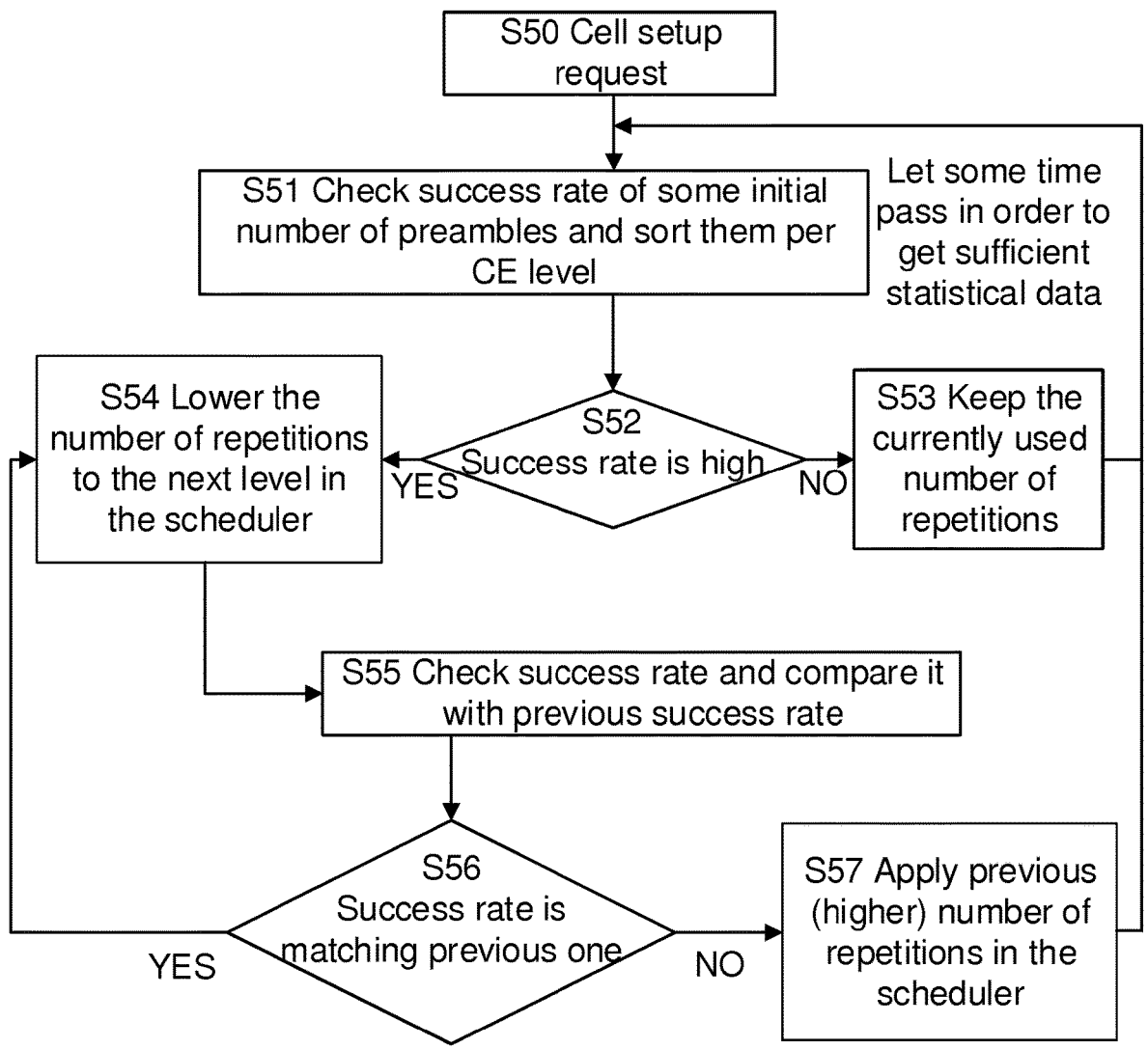
FIG. 5 is a flowchart illustrating example method steps according to some embodiments.

FIG. 5 is a flowchart illustrating example method steps from a cell setup request to a steady-state implementation of the dynamic repetition level configuration, i.e., the dynamic configuration of repeated transmission of random access response messages.

In step S50 a cell setup request is received representing a starting point from which random access requests may be received and consequently implying a need for the method discussed with reference to FIG. 4.

Initially, a ratio of successful to initiated random access attempts, i.e., an RA success rate, is checked S51 for an initial number of preambles and may also be sorted per CE level. The success rate may be analysed for all wireless devices during some hours when initiating the method in a cell without any historical RA data and using an initial repetition level that is a highest allowed repetition level. All wireless devices that attach to the cell by transmitting a random access request message may be subject to the proposed analysis of RA success rate.

In the proposed solution, both failing and successful random access attempts in a specific period of time in real traffic situations could be used as a data source to create a more dynamic selection of number of repetitions that are actually required for the access response messages, e.g., on MPDCCH CSS Type2 channel.

The success rate is determined as high or low in step S52. When the success rate is determined as high, when determining a ratio of successful to initiated random access attempts, an operational repetition level lower than the initial repetition level may be selected, lowering S54 the number of repetitions to the next level in the scheduler. If the success rate is determined not to be high, the method implies keeping S53 the currently used number of repetitions.

Proceeding with the lower number of repetitions selected in S54, a success rate using this lower number is checked S55 and may be compared to the previous success rate. If the comparison S56 of the success rate to a previous success rate reveals that the success rate is the same or better than the previous success rate, the lower repetition level may be maintained or lowered S54 yet again to a next, lower level in the scheduler. If the comparison S56 reveals that the success rate is reduced compared to the previous success rate, a previous higher number of repetitions, implying a higher repetition level, will be applied S57 in the scheduler.

Figure 6A:
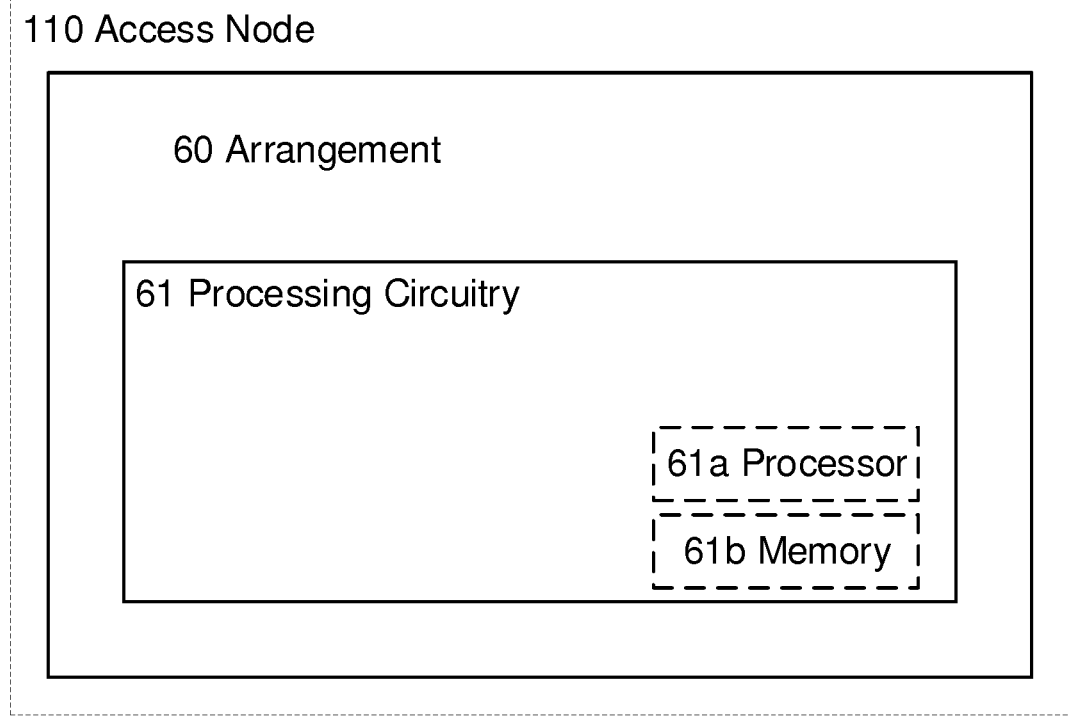
FIG. 6
a. illustrates an example network node configuration according to some embodiments; and
b. illustrates an example network node configuration according to some embodiments.

FIG. 6a is a schematic block diagrams illustrating an example arrangement 60 for dynamically configuring repeated transmission of random access response messages from an access node, wherein the random access response message is repeatedly transmitted in response to receipt of a random access request from wireless device operating in a coverage enhancement, CE, mode and wherein the random access response message is configured for repeated transmission on a downlink channel using a repetition level selected from a set of repetition levels associated with a CE level of the CE mode. The repetition level represents a predetermined number of repeated transmissions and the CE level represents a group of wireless devices with similar radio conditions. The example arrangement of FIG. 6a may, for example, be configured to perform method steps described in connection with FIGS. 4 and 5.

The arrangement comprises processing circuitry 61 configured to cause determination, for a predetermined data set, of a ratio of successful to initiated random access attempts when applying a selected repetition level of the set of repetition levels for repeated transmission of the random access response messages on the downlink channel, wherein a random access attempt is counted as successful responsive to receipt of a first uplink transmission on a packet uplink shared channel, PUSCH. The processing circuitry is further configured to cause selection of an operational repetition level of the set of repetition levels for repeated transmission of random access response messages on the downlink channel based on the determined ratio.

According to aspects of the disclosure, the processing circuitry comprises a processor 61a and a memory 61b. The processor 61a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit, but may be provided as any number of units or circuitry. According to aspects of the disclosure, the arrangement may be implemented in and access node 110 or in a host computer.

The memory may be configured to store information received about the wireless device ranking order and/or the scheduling order. The memory may further be configured to store received or transmitted data and/or executable program instructions. The memory may be any suitable type of computer readable memory and may be of volatile and/or non-volatile type.

In some embodiments of the arrangement 60, the processing circuitry 61 is further configured to cause application of the selected operational repetition level and may also optionally be configured to cause repetition of the method by performing the determination following application of the selected operational repetition level, e.g., with a periodicity correlated to the selected operational repetition level.

In some embodiments, the processing circuitry may further be configured to cause compilation of a sequence of repetition levels to be applied based on time of day, the sequence of repetition levels comprising the initial repetition level and one or more operational repetition levels.

According to aspects of the disclosure, the arrangement may be comprised in a network node, e.g., an access node 110 as disclosed in FIG. 1.

Figure 6B:
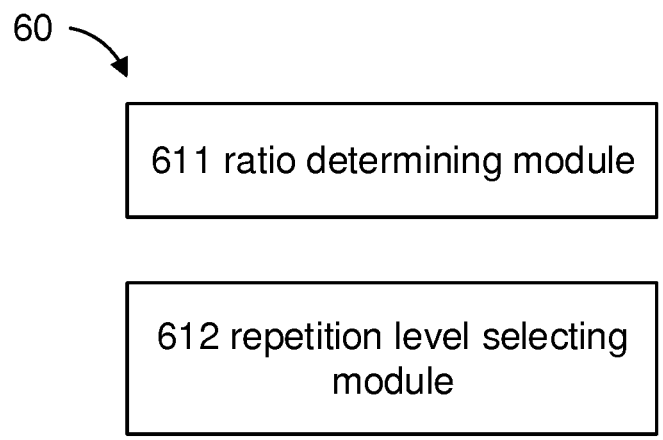

FIG. 6*b* provides another illustration of the arrangement in a schematic block diagram. The arrangement comprises a ratio determining module 611 configured for determining, for a predetermined data set, a ratio of successful to initiated random access attempts when applying a selected repetition level of the set of repetition levels for repeated transmission of the random access response messages on the downlink channel, wherein a random access attempt is counted as successful responsive to receipt of a first uplink transmission on a packet uplink shared channel, PUSCH. The arrangement further comprises a repetition level selecting module 612 configured for selecting an operational repetition level of the set of repetition levels for repeated transmission of random access response messages on the downlink channel based on the determined ratio. The example arrangement of FIG. 6*b* may, for example, be configured to perform method steps described in connection with FIGS. 4 and 5.

Figure 7:
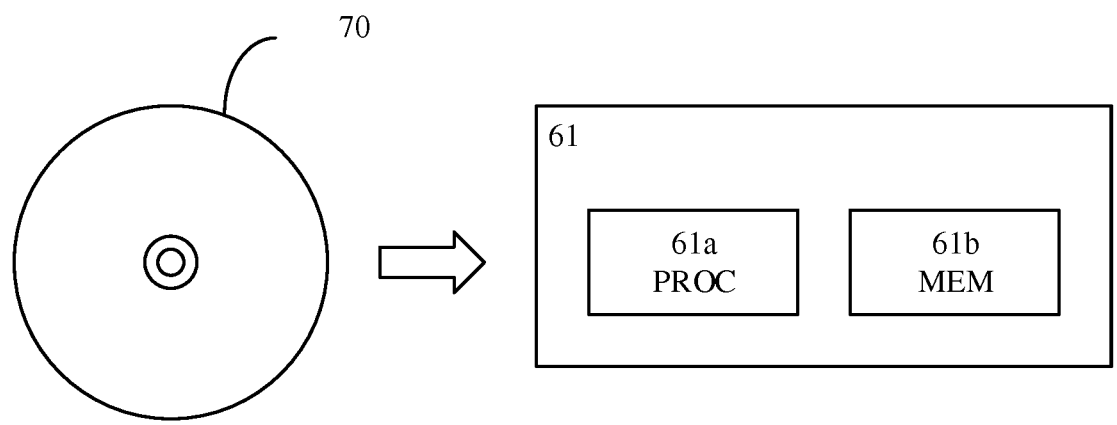
FIG. 7 is schematic drawing illustrating an example computer readable medium according to some embodiments.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. FIG. 7 is a schematic drawing illustrating an example computer readable medium 70 according to some embodiments.

The computer program instructions can be provided to a processor 61*a* of the arrangement disclosed in FIGS. 6*a* and *b*, e.g., to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams of FIGS. 6*a* and *b* and/or flowchart blocks disclosed and discussed with reference to FIGS. 4 and 5.

In some implementations and according to some aspects of the disclosure, functions disclosed as performed in a certain order in a block of the block diagram can occur out of the order.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology relevant for MTC application has been used, the disclosed methods and arrangements are applicable to any types of wireless device using the random access procedure of FIG. 2 or similar random access procedures.

The description of the example embodiments provided herein have been presented for purposes of illustration. The description is not intended to be exhaustive or to limit example embodiments to the precise form disclosed; modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method for dynamically configuring repeated transmission of random access response messages from an access node; wherein the random access response message is repeatedly transmitted in response to receipt of a random access request from a wireless device operating in a coverage enhancement (CE) mode; wherein the random access response message is configured for repeated transmission on a downlink channel using a repetition level selected from a set of repetition levels associated with a CE level of the CE mode; wherein the repetition level represents a predetermined number of repeated transmissions; wherein the CE level represents a group of wireless devices with similar radio conditions; the method comprising:

determining, for a predetermined data set, a ratio of successful to initiated random access attempts when applying a selected repetition level of the set of repetition levels for repeated transmission of the random access response messages on the downlink channel; wherein a random access attempt is counted as successful responsive to receipt of a first uplink transmission on a packet uplink shared channel (PUSCH); and selecting an operational repetition level of the set of repetition levels for repeated transmission of random access response messages on the downlink channel based on the determined ratio.

2. The method of claim 1, wherein the wireless device is a Machine Type Communication (MTC) device.

3. The method of claim 2, wherein the downlink channel is an MTC physical downlink control channel (MPDCCH) or a physical downlink shared channel (PDSCH).

4. The method of claim 3:

wherein the predetermined data set represents data collected on the CE level; and wherein the data is collected on the CE level for a predetermined number of random access attempts or over a predetermined time period.

5. The method of claim 4, further comprising applying the selected operational repetition level.

6. The method of claim 5, wherein a first operational repetition level is selected based on a ratio determined for an initial data set collected when applying a selected initial repetition level.

7. The method of claim 6:

wherein the selected initial repetition level is a highest allowed repetition level;

wherein a highest allowed repetition level represents a highest predetermined number of repeated transmissions within the set of repetition levels associated with the CE level.

8. The method of claim 6, further comprising repeating the method by performing the determining when applying the selected operational repetition level.

9. The method of claim 8, wherein the repeating is performed with a periodicity correlated to the selected operational repetition level.

10. The method of claim 9, wherein the predetermined data set comprises, when the selected operational repetition level represents a repetition level lower than the highest allowed repetition level, a smaller amount of data than that of the highest repetition level.

11. The method of claim 8, further comprising reapplying a previous repetition level when the ratio of successful to initiated random access attempts is reduced in response to applying the selected operational repetition level.

12. The method of any of claim 9, further comprising compiling a sequence of repetition levels to be applied based on time of day, the sequence of repetition levels comprising the initial repetition level and one or more operational repetition levels.

13. The method of claim 5, wherein the selected operational repetition level is selected and applied for repeated transmission of random access response messages on the MPDCCH channel.

14. The method of claim 5, wherein the selected operational repetition is selected and applied for repeated transmission of random access response messages on the PDSCH channel.

15. A non-transitory computer readable recording medium storing a computer program product for controlling a network node for dynamically configuring repeated transmission of random access response messages from an access node; wherein the random access response message is repeatedly transmitted in response to receipt of a random access request from a wireless device operating in a coverage enhancement (CE) mode; wherein the random access response message is configured for repeated transmission on a downlink channel using a repetition level selected from a set of repetition levels associated with a CE level of the CE mode; wherein the repetition level represents a predetermined number of repeated transmissions; wherein the CE level represents a group of wireless devices with similar radio conditions; the computer program product comprising program instructions which, when run on processing circuitry of the network node, causes the network node to:
  determine, for a predetermined data set, a ratio of successful to initiated random access attempts when applying a selected repetition level of the set of repetition levels for repeated transmission of the random access response messages on the downlink channel; wherein a random access attempt is counted as successful responsive to receipt of a first uplink transmission on a packet uplink shared channel (PUSCH); and
  select an operational repetition level of the set of repetition levels for repeated transmission of random access response messages on the downlink channel based on the determined ratio.

16. An arrangement for dynamically configuring repeated transmission of random access response messages from an access node; wherein the random access response message is repeatedly transmitted in response to receipt of a random access request from a wireless device operating in a coverage enhancement (CE) mode; wherein the random access response message is configured for repeated transmission on a downlink channel using a repetition level selected from a set of repetition levels associated with a CE level of the CE mode; wherein the repetition level represents a predetermined number of repeated transmissions; wherein the CE level represents a group of wireless devices with similar radio conditions; the arrangement comprising processing circuitry configured to:
  determine, for a predetermined data set, a ratio of successful to initiated random access attempts when applying a selected repetition level of the set of repetition levels for repeated transmission of the random access response messages on the downlink channel; wherein a random access attempt is counted as successful responsive to receipt of a first uplink transmission on a packet uplink shared channel (PUSCH); and
  select an operational repetition level of the set of repetition levels for repeated transmission of random access response messages on the downlink channel based on the determined ratio.

17. The arrangement of claim 16, wherein the processing circuitry is further configured to apply the selected operational repetition level.

18. The arrangement of claim 17, wherein the processing circuitry is further configured to repeat the method by performing the determination following application of the selected operational repetition level.

19. The arrangement of claim 18, wherein the processing circuitry is further configured to perform the repeating the method with a periodicity correlated to the selected operational repetition level.

20. A network node, comprising
  an arrangement for dynamically configuring repeated transmission of random access response messages from an access node; wherein the random access response message is repeatedly transmitted in response to receipt of a random access request from a wireless device operating in a coverage enhancement (CE) mode; wherein the random access response message is configured for repeated transmission on a downlink channel using a repetition level selected from a set of repetition levels associated with a CE level of the CE mode; wherein the repetition level represents a predetermined number of repeated transmissions; wherein the CE level represents a group of wireless devices with similar radio conditions; the arrangement comprising processing circuitry configured to:
    determine, for a predetermined data set, a ratio of successful to initiated random access attempts when applying a selected repetition level of the set of repetition levels for repeated transmission of the random access response messages on the downlink channel; wherein a random access attempt is counted as successful responsive to receipt of a first uplink transmission on a packet uplink shared channel (PUSCH); and
  select an operational repetition level of the set of repetition levels for repeated transmission of random access response messages on the downlink channel based on the determined ratio.

* * * * *